(12) United States Patent
Hewson et al.

(10) Patent No.: US 8,047,159 B2
(45) Date of Patent: Nov. 1, 2011

(54) PORTABLE PET BOWL (75) Inventors: Thomas Charles Hewson, Loveland, CO (US); Thomas Anthony Nomina, Berthoud, CO (US); Donald Joseph Suriani, Loveland, CO (US)

(73) Assignee: TNT Products LLC, Loveland, CO (US)

(*) Notice: Subject to any disclaimer, the term of this patent is extended or adjusted under 35 U.S.C. 154(b) by 0 days.

(21) Appl. No.: 12/844,015

(22) Filed: Jul. 27, 2010

(65) Prior Publication Data
US 2011/0017141 A1 Jan. 27, 2011

Related U.S. Application Data (63) Continuation of application No. 29/354,788, filed on Jan. 28, 2010, now Pat. No. Des. 621,556, and a continuation of application No. 29/340,836, filed on Jul. 27, 2009, now Pat. No. Des. 621,555.

(60) Provisional application No. 61/228,747, filed on Jul. 27, 2009.

(51) Int. Cl.
*A01K 7/02* (2006.01)
(52) U.S. Cl. .......................................................... 119/72
(58) Field of Classification Search .................. 119/51.5, 119/61.5, 61.56, 61.54, 61.55, 61.52, 72; A01K 7/02, 5/00, 5/01, 7/00
See application file for complete search history.

(56) References Cited

U.S. PATENT DOCUMENTS

| | | | | |
|---|---|---|---|---|
| D254,454 S | * | 3/1980 | Clugston | D30/130 |
| 4,192,256 A | * | 3/1980 | Clugston | 119/51.5 |
| 4,651,679 A | * | 3/1987 | Fassauer | 119/51.5 |
| 4,735,171 A | * | 4/1988 | Essex | 119/51.12 |
| D335,197 S | | 4/1993 | Strickland | |
| D338,285 S | * | 8/1993 | Chrisco | D30/121 |
| 5,467,735 A | * | 11/1995 | Chrisco | 119/51.5 |
| 5,730,082 A | * | 3/1998 | Newman | 119/51.5 |

(Continued)

FOREIGN PATENT DOCUMENTS
EP 1084613 A1 * 3/2001
(Continued)

OTHER PUBLICATIONS

Webpage from http://thedrinkingspot.com, Kansas Outdoor Group LLC, Winfield, KS, Jun. 3, 2009.

*Primary Examiner* — Son T Nguyen
*Assistant Examiner* — Shadi Baniani
(74) *Attorney, Agent, or Firm* — Wood, Herron & Evans, L.L.P.

(57) ABSTRACT

A pet bowl includes a unitary housing having a front portion and a rear portion. The housing defines an internal chamber having a bottom wall upon which the housing sits in a first/dispensing orientation and a rear wall upon which the housing sits in a second/storage orientation. The housing also includes a first receptacle formed at the rear portion and a second receptacle formed at the front portion. A fluid flow port defined in the housing provides fluid communication between the internal chamber and the second receptacle. A handle is formed by a sidewall of the second receptacle defining a first lip, and a groove in the bottom wall defining a second lip. The housing may further include a transition wall angled from the bottom wall and rear wall, the housing configured to sit on the transition wall in a third/draining orientation.

13 Claims, 13 Drawing Sheets

U.S. PATENT DOCUMENTS

| | | | |
|---|---|---|---|
| 5,809,934 A * | 9/1998 | Gavet | 119/52.1 |
| 6,067,935 A | 5/2000 | Rodes | |
| 6,302,059 B1 | 10/2001 | Faith et al. | |
| 6,378,460 B1 * | 4/2002 | Skurdalsvold et al. | 119/61.56 |
| D478,693 S | 8/2003 | Steinbacher | |
| 6,718,911 B2 | 4/2004 | Greenberg | |
| 7,284,499 B1 * | 10/2007 | Kuster | 119/51.5 |
| 7,748,538 B2 * | 7/2010 | Esrich | 206/577 |
| 2010/0122660 A1 * | 5/2010 | Willett | 119/51.5 |

FOREIGN PATENT DOCUMENTS

| | | | |
|---|---|---|---|
| JP | 09051736 A | * | 2/1997 |
| JP | 2002360095 A | * | 12/2002 |

* cited by examiner

PORTABLE PET BOWL

CROSS-REFERENCE TO RELATED APPLICATIONS

This application claims the priority of U.S. Provisional Patent Application No. 61/228,747, filed Jul. 27, 2009; U.S. Design patent application No. 29/340,836, filed Jul. 27, 2009; and U.S. Design patent application No. 29/354,788, filed Jan. 28, 2010, each of which is hereby incorporated by reference in its entirety.

TECHNICAL FIELD

The invention relates generally to a pet bowl for providing food and water to a pet, and more particularly, to a portable pet bowl that promotes convenience when traveling with a pet.

BACKGROUND

Many people who travel on long trips desire to take their pets along with them rather than make accommodations for the pets while they are away. In another application, hunters of certain kinds of animals will bring dogs along to assist in the hunt. In both cases, provisions must be made to provide food and water for the pet. As will be appreciated, carrying multiple bowls with a water supply and a food supply is inconvenient and may be difficult to use in a vehicle setting. Consequently, pet bowl manufacturers have designed portable pet bowls to address these situations.

In one example, a portable pet bowl is disclosed in U.S. Pat. No. 4,192,256, entitled "Combined Feeding and Watering Device for Pets, Having Integral Means for Carrying Water." This patent shows a unitary pet dish made of a lightweight synthetic resin material. The pet dish includes a food receiving cavity at the top of the dish, and a water holding compartment and a corresponding water receiving recess for holding water that flows outwardly from the water holding compartment. The specification of this patent describes that a person may carry the pet dish when the pet dish is in a generally vertical orientation with the water receiving recess at the top of the pet dish. However, it seems evident that the cuplike shape of the wall defining the water receiving recess would require a cautious pet owner to also use another hand in carrying the pet dish. Otherwise, the pet dish would likely slide off a pet owner's fingers and fall from the pet owner's hand, due to the shape of the cuplike wall, particularly if a significant amount of water is held in the water holding compartment. In short, the cuplike wall is not a useful handle for carrying the pet dish.

Another pet dish currently available commercially is called "The Drinking Spot," available from Kansas Outdoor Group LLC of Winfield, Kans. (see http://thedrinkingspot.com). The Drinking Spot is an outdoor gravity feed pet system. The system includes a housing defining an internal chamber and an open recess at the front of the internal chamber configured to receive water from the internal chamber. The system may be tipped onto a back wall and carried in a vertical orientation by a handle connected to the housing. This handle is separate from the housing and therefore may be broken away from the housing in a failure anode of the system. This failure mode is especially present in the Drinking Spot system because all versions disclosed hold over 2.5 to 5 gallons of water, which is a significant weight that may be hard to carry. Furthermore, the handle extends over the open recess and thus at least partially obstructs access to the open recess for large dogs who try to drink the water in the open recess.

Thus, while conventional pet bowls are generally successful for their intended purpose, there remains a need for an improved pet bowl that addresses these and other shortcomings in conventional pet bowl designs.

SUMMARY OF THE INVENTION

A pet bowl according to an exemplary embodiment of the present invention includes a unitary housing having a front portion with a front wall and a rear portion. The housing includes an internal chamber having a top wall, a bottom wall, and a rear wall. The housing is configured to sit upon the bottom wall in a first or dispensing orientation, and further configured to sit upon the rear wall in a second or storage orientation. The pet bowl further includes an open-topped first receptacle located at the rear portion of the housing. The first receptacle is formed by recessed portions in the top wall. The pet bowl also includes an open-topped second receptacle located at the front portion of the housing. The second receptacle is defined by the top wall and a sidewall forming a first lip at the front end.

The pet bowl further includes a fluid flow port at the front portion of the housing that provides fluid communication between the second receptacle and the internal chamber. When the pet bowl sits in the first orientation, water may flow out of the internal chamber into the second receptacle for drinking. The pet bowl further includes a groove defining a second lip in the bottom wall at the front end of the housing. The first lip and the second lip collectively define a handle for securely carrying the pet bowl when the housing sits in the second orientation. The housing, the sidewall, and the handle are all integrally formed of a plastic material such as rotationally molded medium density polyethylene (MDPE) material.

In another embodiment of the invention, a pet bowl includes a unitary housing having a front portion and a rear portion. The housing defines an internal chamber having a top wall, a bottom wall, a rear wall, and a transition wall angled from and disposed between the rear wall and the bottom wall at the rear portion. The pet bowl also includes an open-topped first receptacle located at the rear portion of the housing and formed by recessed portions in the top wall. The pet bowl further includes an open-topped second receptacle located at the front portion of the housing and formed by the top wall and a sidewall. The top wall has a first portion forming a bottom of the second receptacle, a second portion transverse to the first portion and forming a side of the second receptacle, and a third portion disposed between the first and second portions and angled from each of the first and second portions. A fluid flow port is provided in this third portion of the top wall to place the second receptacle in fluid communication with the internal chamber.

The housing may sit in a first or dispensing orientation on the bottom wall. In this first orientation, water in the internal chamber flows through the fluid flow port into the second receptacle for a pet to drink. The housing may also sit in a second or storage orientation on the rear wall. The transition wall is formed generally parallel to the third portion of the top wall such that water from the second receptacle tends to drain through the fluid flow port back into the internal chamber when the housing is moved to a third or draining orientation sitting on the transition wall.

BRIEF DESCRIPTION OF THE DRAWINGS

The present application will be more readily understood in the context of the drawings, which are described below.

DETAILED DESCRIPTION OF THE PREFERRED EMBODIMENTS

Figure 1:
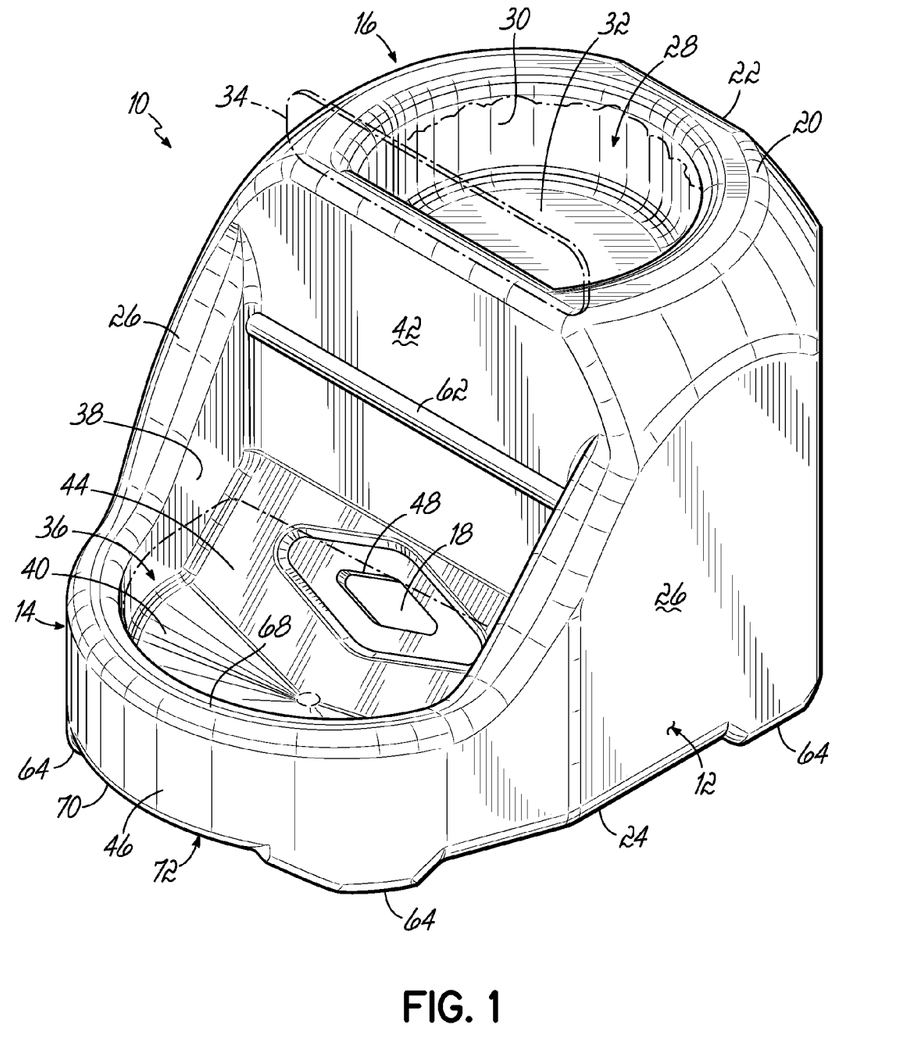
FIG. 1 is a front perspective view of a pet bowl according to one embodiment of the present invention.
Figure 2:
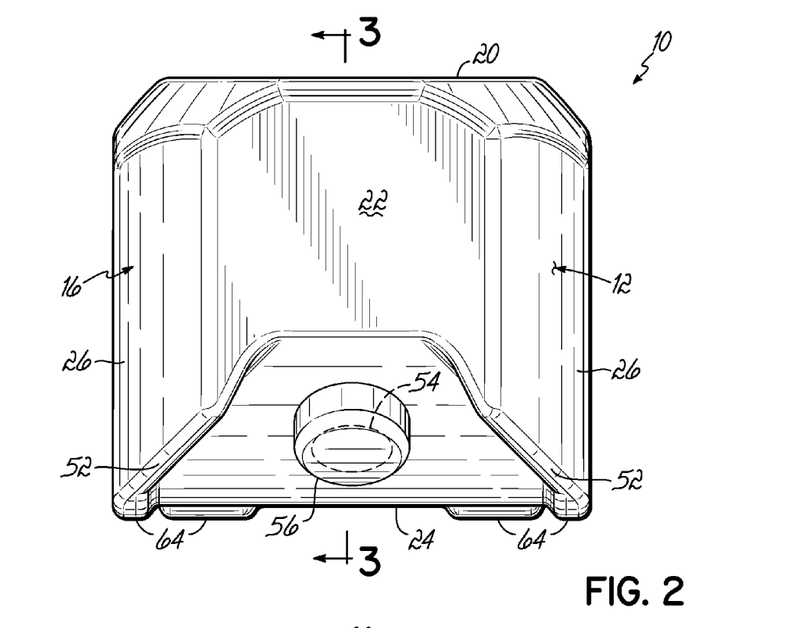
FIG. 2 is a rear elevation view of the pet bowl of FIG. 1.
Figure 3:
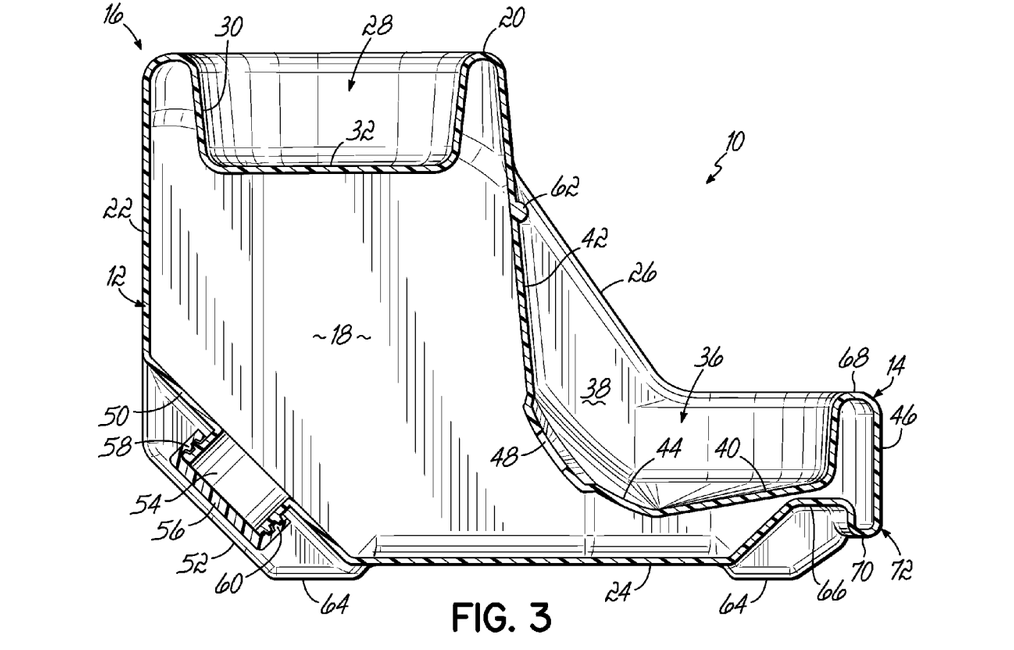
FIG. 3 is a cross-sectional side view of the pet bowl of FIG. 1, taken along line 3-3 in FIG. 2.

FIG. 1 shows a pet bowl 10 configured to be portable and used both when a pet is at home and when a pet is traveling or hunting away from the home. As shown in FIG. 1, the pet bowl 10 includes a unitary housing 12 having a front portion 14 and a rear portion 16. The housing 12 defines an internal chamber 18 having a top wall 20, a rear wall 22, a bottom wall 24, and a sidewall 26 that is generally U-shaped when viewed from above the housing 12. The internal chamber 18 is configured to hold a supply of water for the pet, as will be described in further detail below. It will be appreciated that the terms top, bottom, rear, front, side, and similar direction-oriented terms are used to describe the relative locations of these elements of the housing 12 when the housing 12 sits on the bottom wall 24 in a first or dispensing orientation as shown in FIGS. 1-3, and do not limit the housing 12 to any particular shape or size.

The pet bowl 10 further includes an open-topped first receptacle 28 formed at the rear portion 16 of the housing 12. The first receptacle 28 is formed by recessed portions of the top wall 20 defining a first receptacle sidewall 30 and a first receptacle bottom wall 32. The first receptacle 28 is configured to hold food (shown in phantom in FIG. 1) for a pet when the housing 12 sits in the first/dispensing orientation. Also shown in phantom in FIG. 1, a food guard 34 may be selectively coupled to the top wall 20 at the junction of the front portion 14 and the rear portion 16 of the housing 12. The food guard 34 prevents food from falling out of the first receptacle 28 into an open-topped second receptacle 36 configured to hold water as described in further detail below. It will be appreciated that the food guard 34 may be any appropriate size for blocking food, and may be integrally formed with the top wall 20 or coupled to the top wall 20 in any known manner.

The pet bowl 10 further includes the open-topped second receptacle 36 formed at the front portion 14 of the housing 12. The second receptacle 36 is formed by the top wall 20 and an inner side 38 of the generally U-shaped sidewall 26. More particularly, the top wall 20 includes a first portion 40 that is substantially horizontal in the first/dispensing orientation, a second portion 42 that is transverse to the first portion 40 and substantially vertical in the first/dispensing orientation, and a third portion 44 between the first portion 40 and the second portion 42. The third portion 44 is generally angled from each of the first portion 40 and the second portion 42. The sidewall 26 tapers in height from the rear portion 16 of the housing 12 toward a front end 46 of the housing 12 and projects upwardly beyond the top wall 20 at the second portion 42 and the third portion 44. Thus, the second receptacle 36 has a bottom formed by the second portion 42 and third portion 44 of the top wall 20 and continuous sides formed by the first portion 40 of the top wall 20 and the inner side 38 of the sidewall 26. The second receptacle 36 is configured to hold water (shown in phantom in FIG. 1) for a pet when the housing 12 sits in the first/dispensing orientation. Consequently, the pet bowl 10 is configured to provide ready access to food and water in the first/dispensing orientation shown in FIG. 1.

The pet bowl 10 also includes a fluid flow port 48 in the housing 12 at the front portion 14. As shown in FIG. 1, the fluid flow port 48 is an aperture through the third portion 44 of the top wall 20. The fluid flow port 48 provides fluid communication between the internal chamber 18 and the second receptacle 36. Thus, water may be stored in the internal chamber 18 and dispensed to the second receptacle 36 for a pet when the housing 12 sits in the first/dispensing orientation. The fluid flow port 48 of the illustrated embodiment is a diamond-shaped aperture, but it will be appreciated that the fluid flow port 48 may define any shape of aperture, including circular, without departing from the scope of this invention.

The pet bowl 10 is integrally formed as one piece, for instance via rotational molding, from a plastic material such as a medium density polyethylene (MDPE) material. Examples of the plastic material used to form the housing 12 include Formolene L64220U4, commercially available from Formosa Plastics Corporation of Livingston, N.J.; ExxonMobil HDPE HD 8660 Series high density polyethylene resin, commercially available from Exxon Mobil Corporation of Houston, Tex.; and medium density R50035 copolymer material, commercially available from Saudi Basic Industries Corporation of Riyadh, Saudi Arabia. Forming the pet bowl 10 from this MDPE material allows the pet bowl 10 to be lightweight and highly sturdy, as required for traveling with or carrying the pet bowl 10.

Further elements of the pet bowl 10 of the exemplary embodiment are shown in FIGS. 2 and 3. The pet bowl 10 may further include a transition wall 50 disposed between the rear wall 22 and the bottom wall 24 at the rear portion 16 of the housing 12. The transition wall 50 is angled from each of the rear wall 22 and the bottom wall 24. The transition wall 50 enables tipping of the housing 12 from the first/dispensing orientation sitting on the bottom wall 24 to a second or storage orientation wherein the housing 12 sits on the rear wall. Additionally, the housing 12 may also sit on the transition wall 50 in a third or draining orientation configured to permit any water in the second receptacle 36 to drain through the fluid flow port 48 back into the internal chamber 18, as will be described in further detail below.

The transition wall 50 may be recessed slightly from bottom edges 52 of the sidewall 26 at the rear portion 16 to provide clearance for an exit port 54 on the transition wall 50. The exit port 54 provides fluid communication between the internal chamber 18 and the exterior outside the housing 12. The pet bowl 10 further includes a removable cap 56 engaged with the exit port 54 to provide selective access to the internal chamber 18. For example, the housing 12 may be turned upside down to sit on the top wall 20 in a fourth or filling orientation, whereby the exit port 54 provides a large aperture to fill the internal chamber 18 with water. Alternatively, the exit port 54 may be opened in the third/draining orientation to drain substantially all of the water from the internal chamber 18. The exit port 54 may include external threads 58 to engage corresponding internal threads 60 on the cap 56. It will be understood that the cap 56 may snap onto the exit port 54 or snugly engage the exit port 54 without the provision of threads in alternative embodiments within the scope of the present invention.

As shown most clearly in FIG. 3, the third portion 44 of the top wall 20 at the second receptacle 36 is substantially parallel to the transition wall 50. In this regard, the first portion 40 and the second portion 42 of the top wall 20 will be angled upwardly from the third portion 44 of the top wall 20 when the housing 12 sits in the third/draining orientation. Thus, the generally parallel relationship of the transition wall 50 and the third portion 44 of the top wall 20 promotes draining of water held in the second receptacle 36 through the fluid flow port 48 and back into the internal chamber 18 when the housing 12 sits in the third/draining orientation. Additionally, the third portion 44 of the top wall 20 may be formed to define a slightly concave profile such that the fluid flow port 48 is located at the very bottom of the third portion 44 in the third/draining orientation. This concave profile further encourages flow of water from the second receptacle 36 back into the internal chamber 18 in the third/draining orientation. The second portion 42 of the top wall 20 may further include at least one ridge 62 extending between the inner sides 38 of the sidewall 26, the ridge 62 inhibiting flow of water away from the third portion 44 of the top wall 20 and the fluid flow port 48 when the housing 12 sits in the third/draining orientation. Thus, the shape of the second receptacle 36 generally promotes flow of water into and out of the second receptacle 36 through the fluid flow port 48. It will be understood that the second portion 42 of the top wall 20 could alternatively be formed slightly convex to provide the same inhibiting function as the at least one ridge 62 without departing from the scope of this invention.

As shown in FIGS. 2 and 3, the sidewall 26 may also project slightly downward at the bottom wall 24 to define a plurality of feet 64 for supporting the housing 12 when sitting on the bottom wall 24 in the first/dispensing orientation. A groove 66 is cut into the housing 12 between two of these feet 64 adjacent to the front end 46. The sidewall 26 defines a first lip 68 at the front end 46 where the sidewall 26 projects above the first portion 40 of the top wall 20, and the sidewall 26 defines an opposing second lip 70 at the front end 46 where the sidewall 26 projects below the groove 66. The first lip 68 and the second lip 70 collectively define a handle 72 for securely carrying the pet bowl 10 when the housing 12 is sitting on the rear wall 22 in the second/storage orientation. The handle 72 advantageously provides lips 68, 70 on both sides of the handle 72 so that a pet owner can grip one lip (i.e., 68) with a thumb and the other lip (i.e., 70) with her fingers for a natural and secure grip. The handle 72 discourages slippage of this grip and makes the pet bowl 10 easier to carry in the second/storage orientation.

Figure 4A:
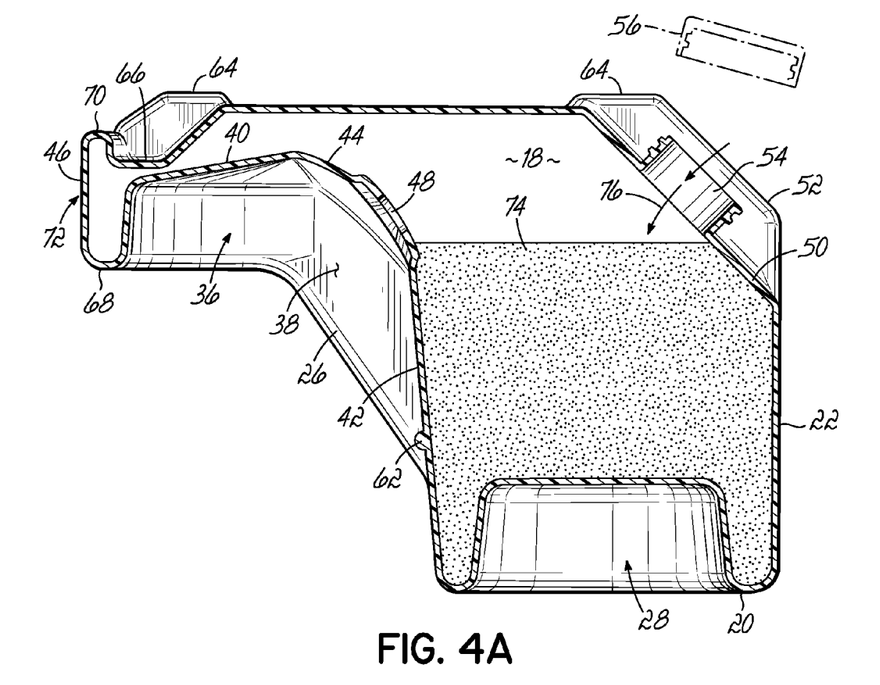
FIG. 4A is a cross-sectional side view of the pet bowl of FIG. 1 in a filling orientation.
Figure 4B:
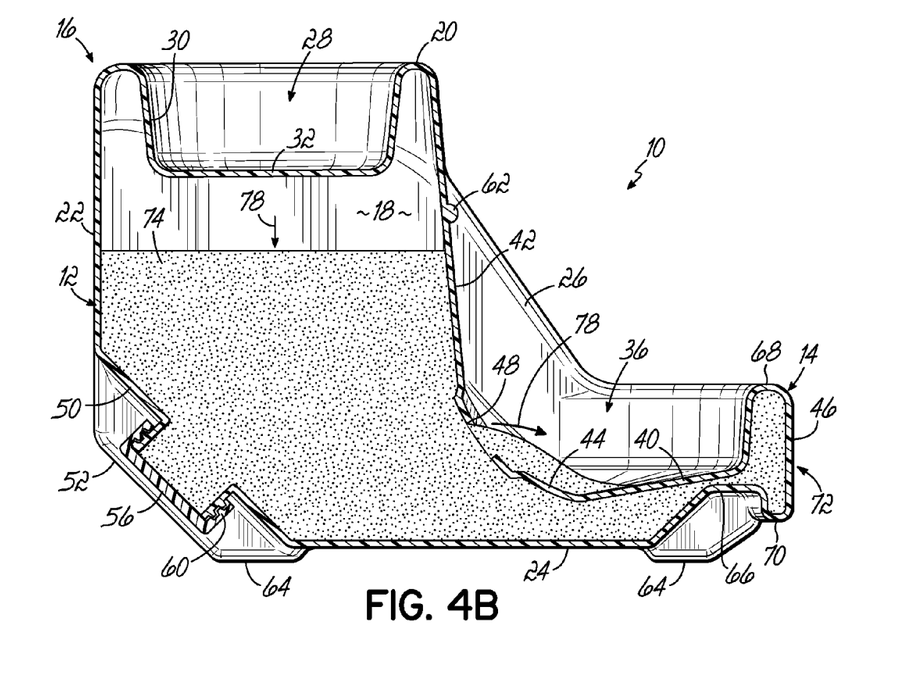
FIG. 4B is a cross-sectional side view of the pet bowl of FIG. 1, illustrating a dynamic state immediately after placing the pet bowl in a dispensing orientation.
Figure 4C:
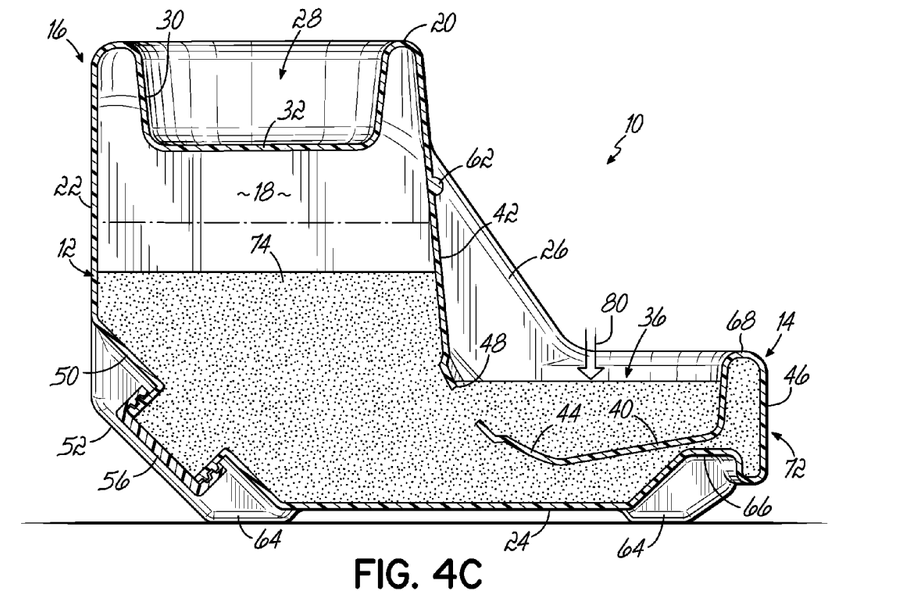
FIG. 4C is a cross-sectional side view of the pet bowl of FIG. 1, illustrating a steady state after placing the pet bowl in the dispensing orientation.

The functionality of the pet bowl 10 is further illustrated in FIGS. 4A-4E. As shown in FIG. 4A, the pet bowl 10 is positioned in the fourth/filling orientation by sitting the housing 12 on the top wall 20. The cap 56 may be removed from the exit port 54 such that water 74 may be delivered into the internal chamber 18 as indicated by arrows 76. Advantageously, the exit port 54 is generally disposed at the same elevation as the fluid flow port 48 in this fourth/filling orientation so that water 74 does not drain immediately out of the fluid flow port 48 during filling. As shown in FIG. 4B, the pet bowl 10 may then be flipped over to the first/dispensing orientation by sitting the housing 12 on the bottom wall 24 at the feet 64. In the dynamic state shown in FIG. 4B immediately after flipping the housing 12, water 74 flows through the fluid flow port 48 into the second receptacle 36 by the force of gravity, as shown by arrows 78. The water 74 continues to flow into the second receptacle 36 until the level of the water 74 covers the fluid flow port 48 as shown in the steady state first/dispensing orientation shown in FIG. 4C. At this steady state position, no more air can freely vent through the fluid flow port 48 into the internal chamber 18 such that the ambient pressure inside the internal chamber 18 decreases slightly below atmospheric pressure. Thus, the atmospheric pressure (indicated by arrow 80) acting on the water 74 in the second receptacle 36 prevents further flow out of the internal chamber 18 until a pet drinks enough water 74 to reduce the water level back below the fluid flow port 48. This gravity feed system is well understood in the art.

Figure 4D:
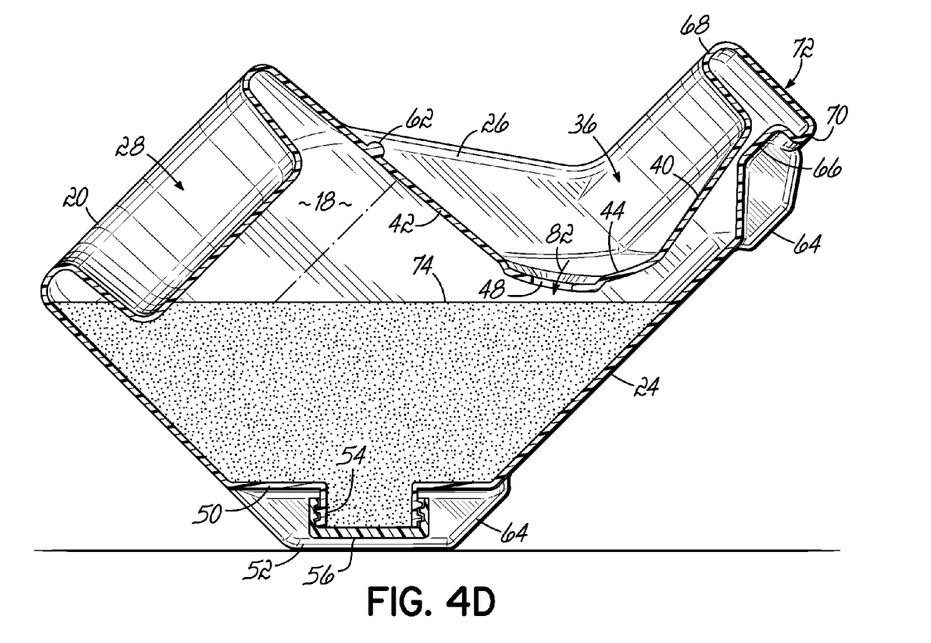
FIG. 4D is a cross-sectional side view of the pet bowl of FIG. 1 in a draining orientation.
Figure 4E:
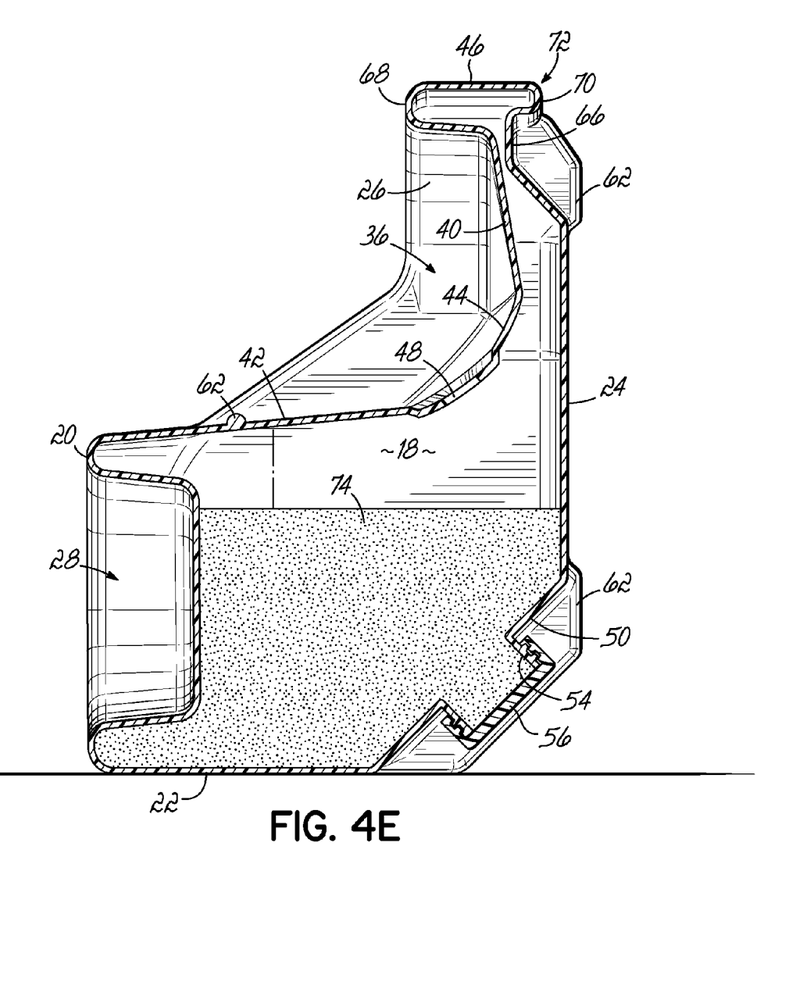
FIG. 4E is a cross-sectional side view of the pet bowl of FIG. 1 in a storage orientation.
Figure 5:
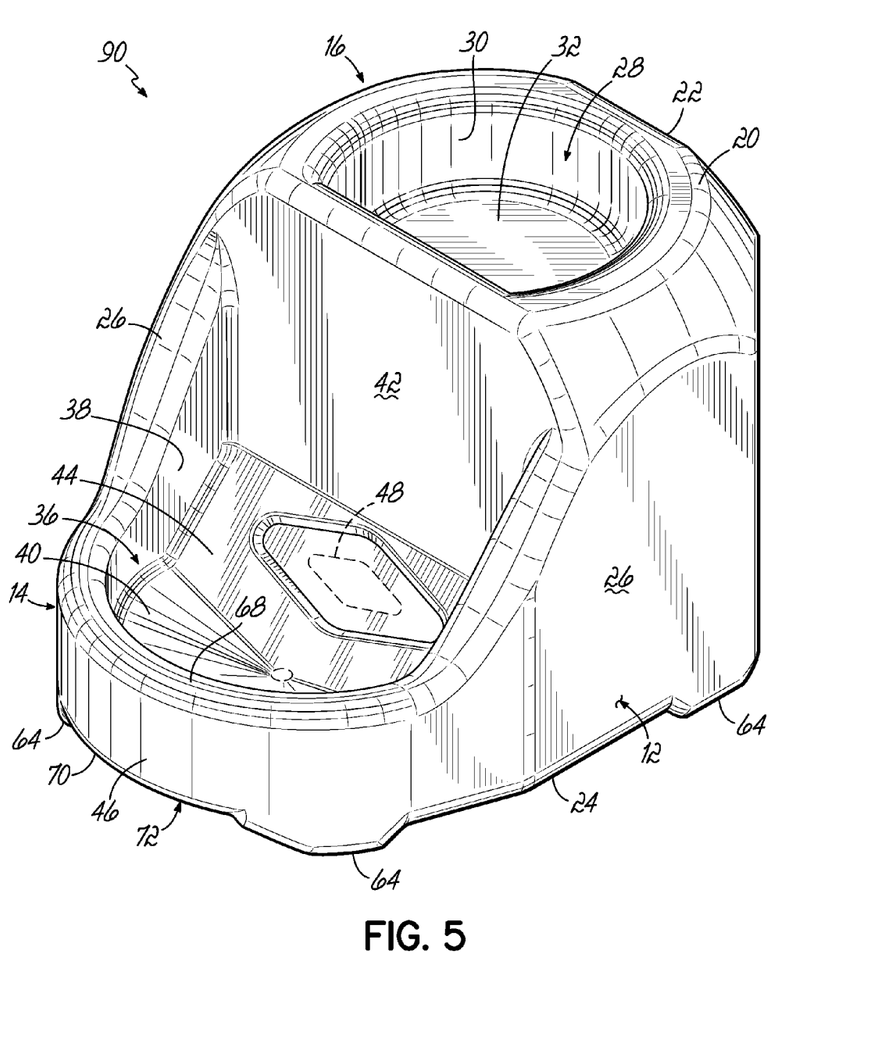
FIG. 5 is a perspective view of another embodiment of the pet bowl showing the design. The broken lines are for illustrative purposes only and form no part of the design in this embodiment.
Figure 6:
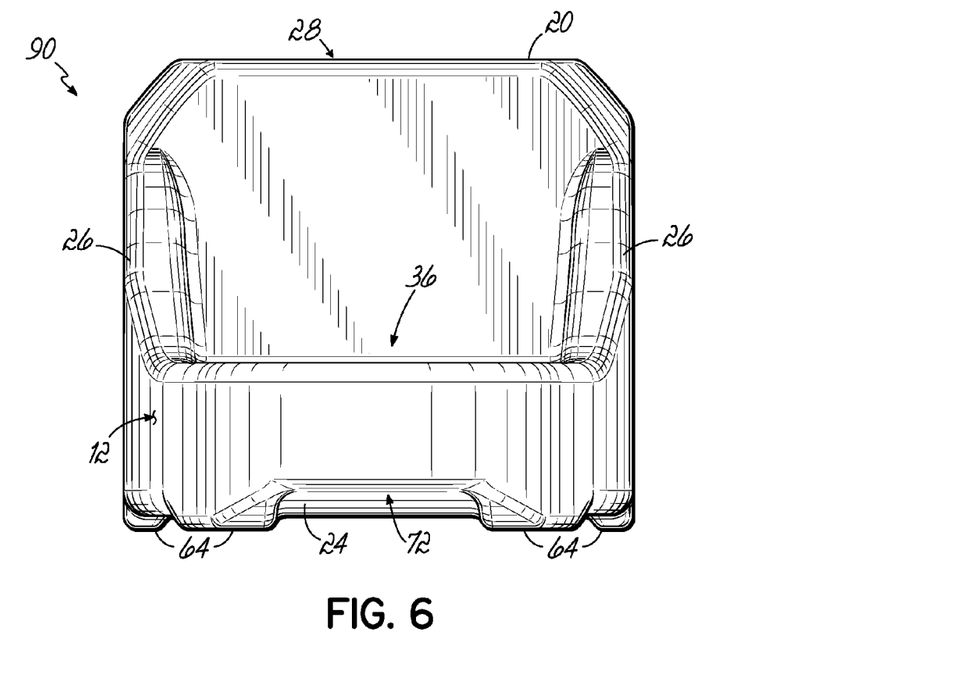
FIG. 6 is a front elevation view of the pet bowl design of FIG. 5.
Figure 7:
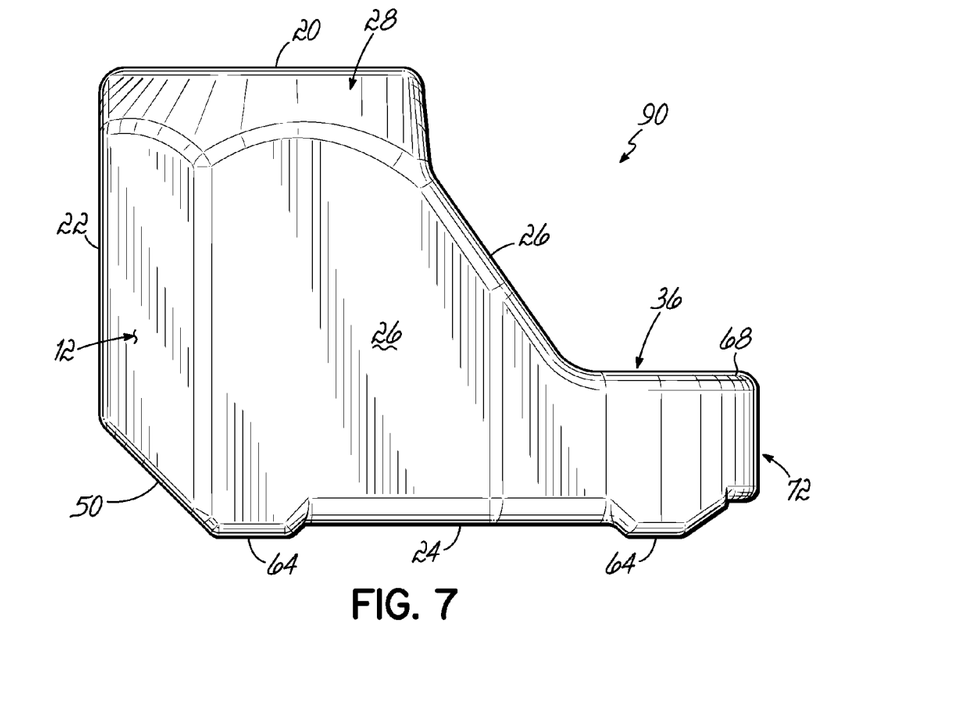
FIG. 7 is a left side elevation view of the pet bowl design of FIG. 5, the right side being a mirror image of the left side.
Figure 8:
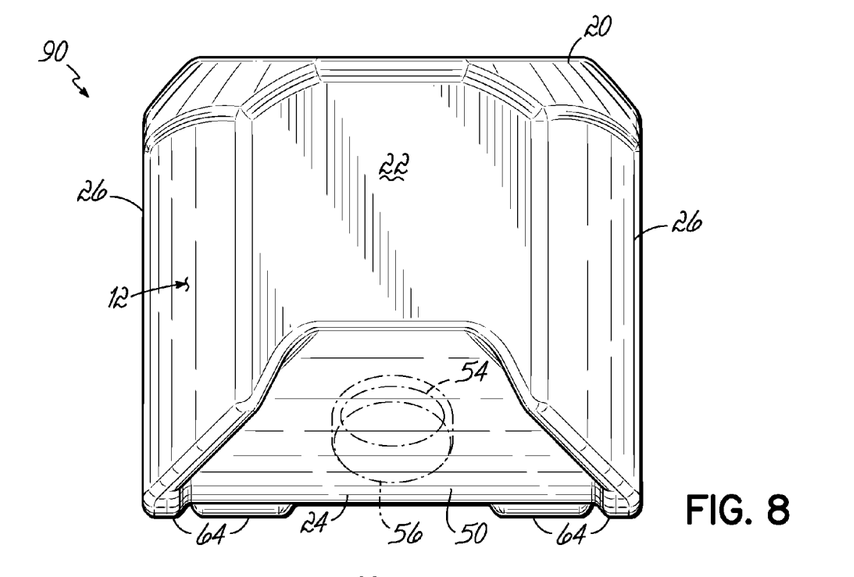
FIG. 8 is a rear elevation view of the pet bowl design of FIG. 5.
Figure 9:
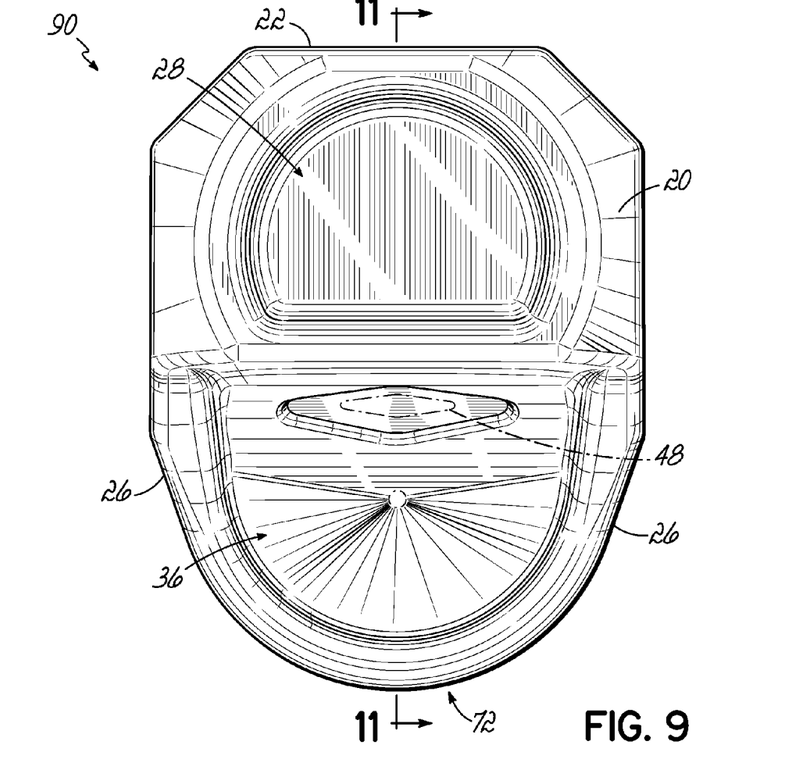
FIG. 9 is a top plan view of the pet bowl design of FIG. 5.
Figure 10:
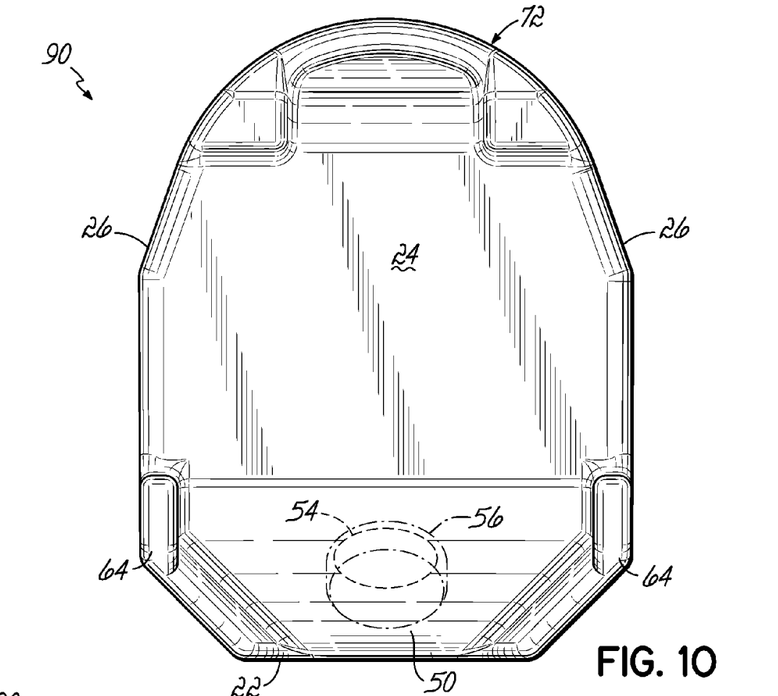
FIG. 10 is a bottom plan view of the pet bowl design of FIG. 5.
Figure 11:
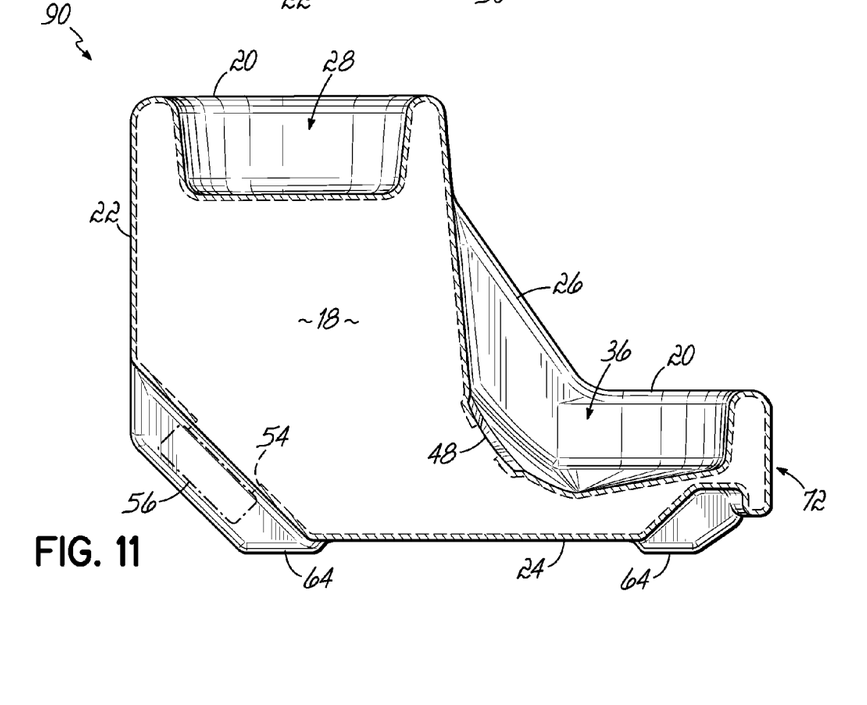
FIG. 11 is a cross-sectional view taken along line 11-11 of FIG. 5. The broken line adjacent to the cross-sectional shading portion of the bowl forms an unclaimed boundary of the design.
Figure 12:
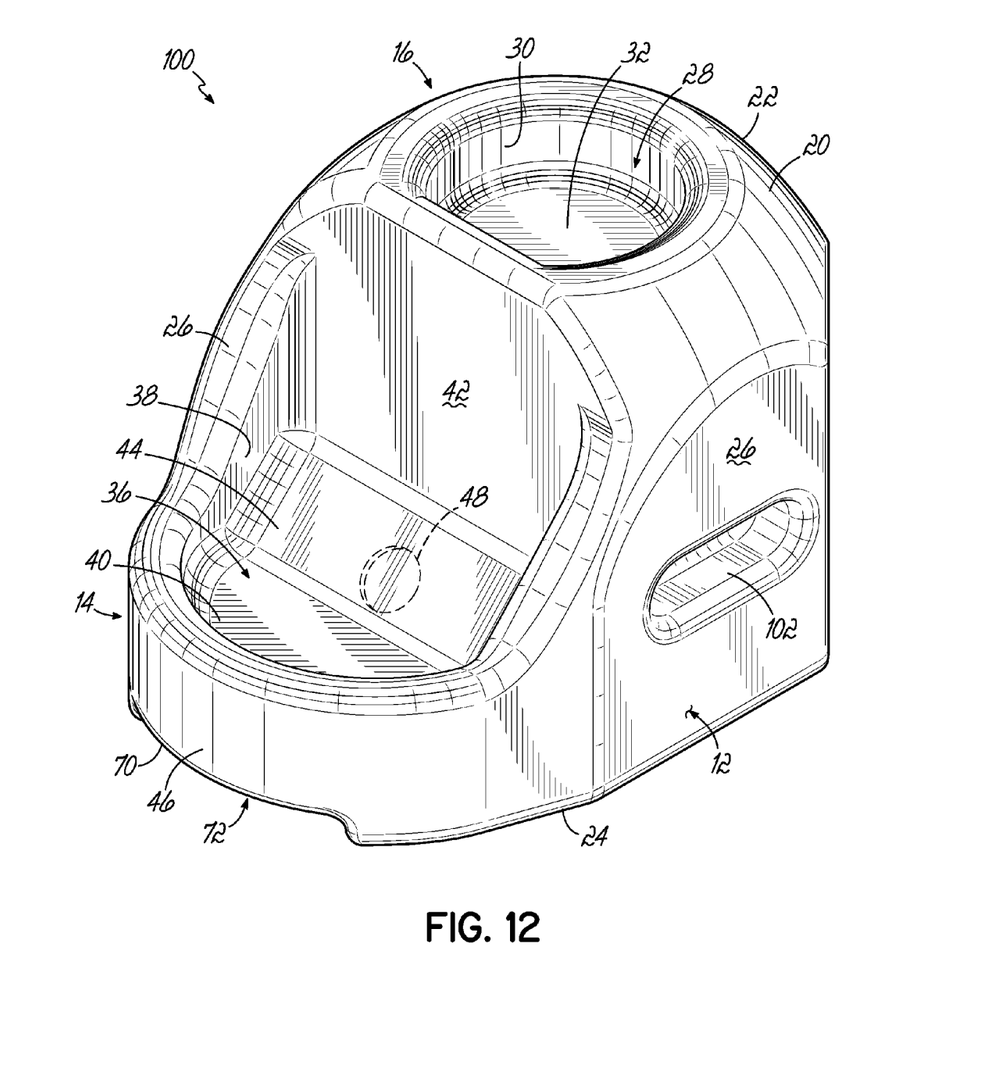
FIG. 12 is a perspective view of another embodiment of the pet bowl showing the design. The broken lines are for illustrative purposes only and form no part of the design in this embodiment.
Figure 13:
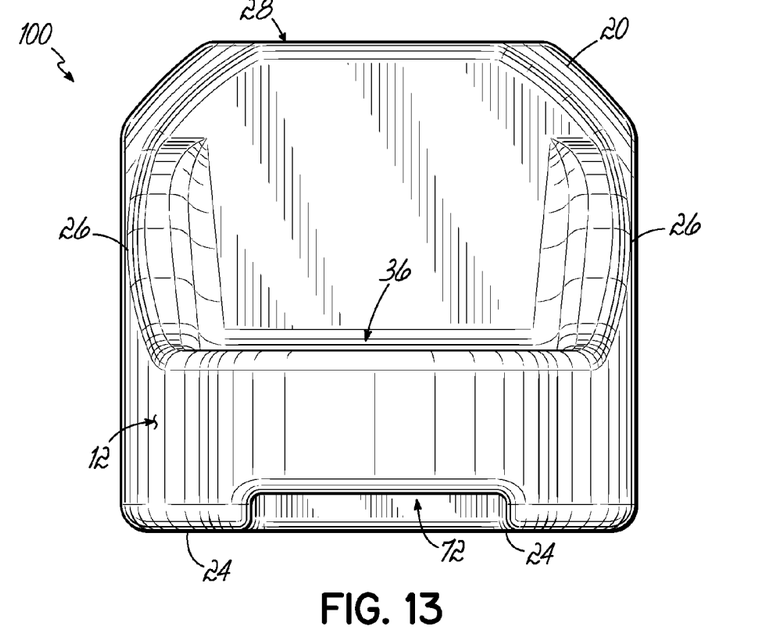
FIG. 13 is a front elevation view of the pet bowl design of FIG. 12.
Figure 14:
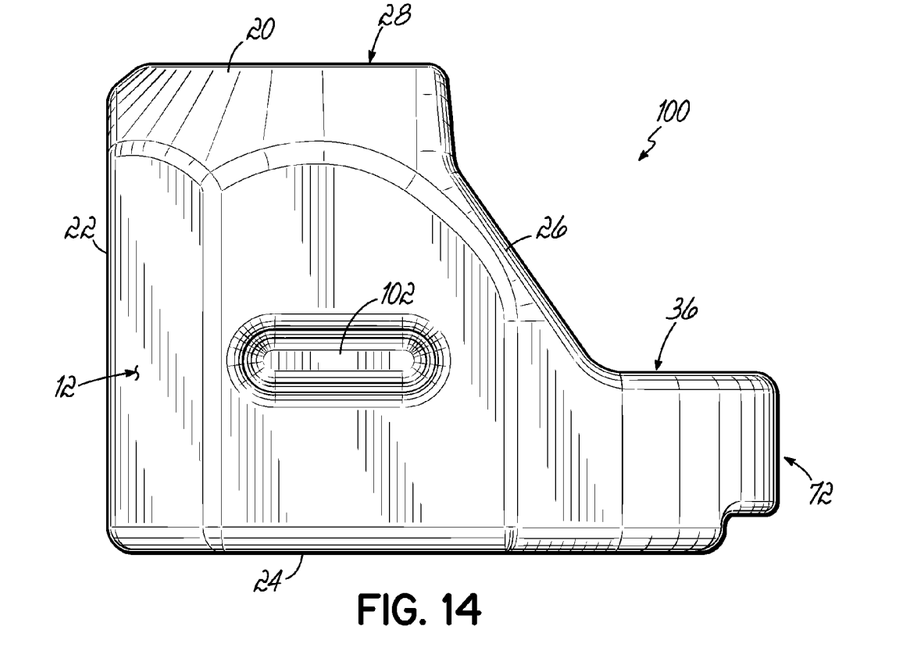
FIG. 14 is a left side elevation view of the pet bowl design of FIG. 12, the right side being a mirror image of the left side.
Figure 15:
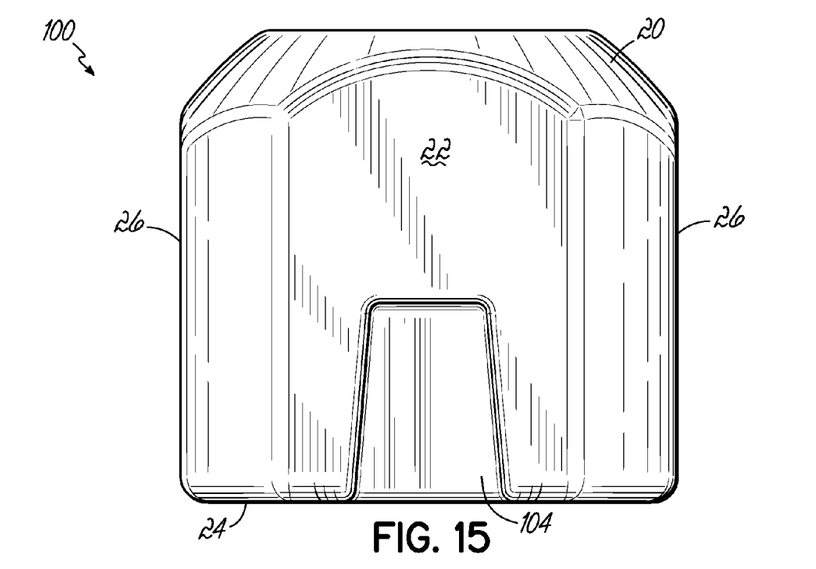
FIG. 15 is a rear elevation view of the pet bowl design of FIG. 12.
Figure 16:
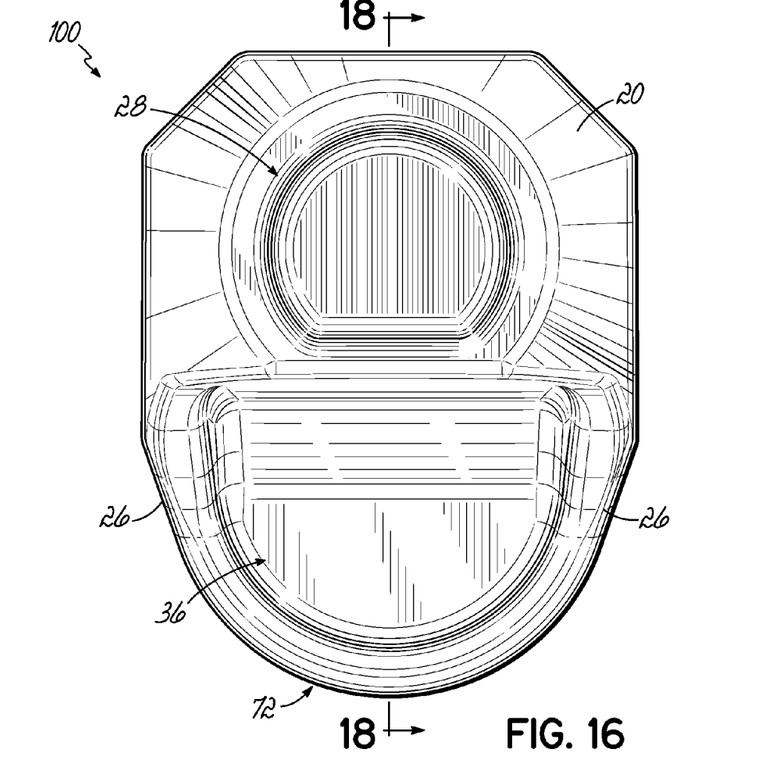
FIG. 16 is a top plan view of the pet bowl design of FIG. 12.

When the pet is finished drinking, the pet bowl 10 may be flipped onto the transition wall 50 to the third/draining orientation as shown in FIG. 4D. As previously described, the first portion 40, second portion 42 with ridge 62, and the slightly concave third portion 44 of the top wall 20 each encourage any remaining water in the second receptacle 36 to flow through the lowest point at the fluid flow port 48 back into the internal chamber 18 (indicated by arrow 82). It will be understood that the cap 56 could be removed from the exit port 54 in this orientation to drain all water 74 from the pet bowl 10. After all of the water has drained from the second receptacle 36, the pet bowl 10 may be flipped onto the rear wall 22 to the second/storage orientation shown in FIG. 4E. In the second/storage orientation, no water 74 is disposed close to the fluid flow port 48 such that the normal vibrations of driving or carrying the pet bowl 10 will not cause water 74 to escape the internal chamber 18. Furthermore, the handle 72 is positioned at the front end 46 which is now at the top of the pet bowl 10 such that the pet bowl 10 may be easily carried by a pet owner. Once the pet bowl 10 is ready for use again, the housing 12 is merely flipped back to the first/dispensing orientation as previously described. No separate plug removal or replacement is necessary with the fluid flow port 48 of the exemplary embodiment.

FIGS. 5-11 illustrate another embodiment of the pet bowl 90, and particularly a specific design of the pet bowl 90. The pet bowl 90 includes many of the same elements described in detail above, and the same reference numbers are used as the previous embodiment on these elements. However, the design is not to be limited by the elements shown in broken lines, and not all the reference numbers have been repeated because this information is cumulative.

FIGS. 12-18 illustrate yet another embodiment of the pet bowl 100, and particularly a specific design of the pet bowl 100. The pet bowl 100 includes many of the same elements described in detail above, and the same reference numbers are used as the previous embodiment on these elements. However, the design is not to be limited by the elements shown in broken lines, and not all the reference numbers have been repeated because this information is cumulative.

Figure 17:
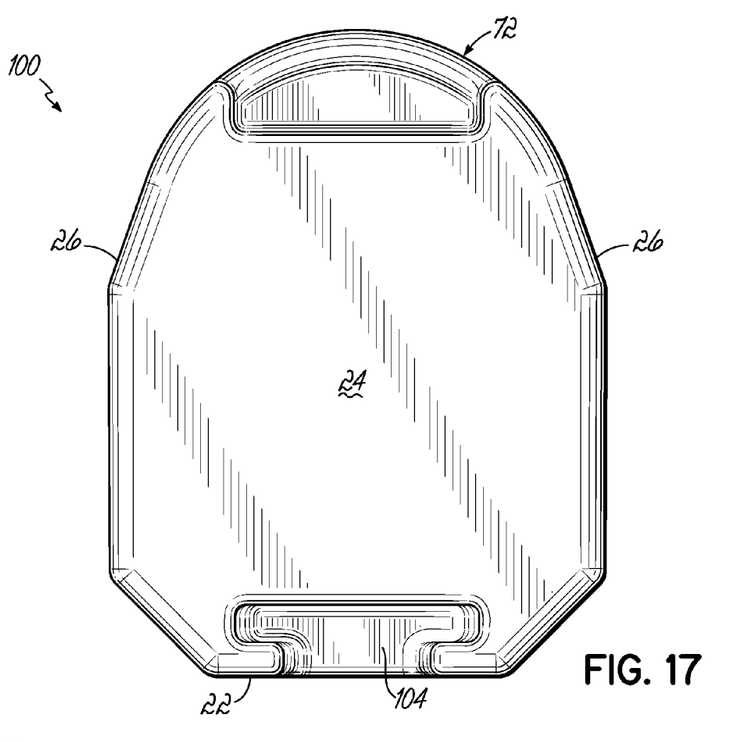
FIG. 17 is a bottom plan view of the pet bowl design of FIG. 12.
Figure 18:
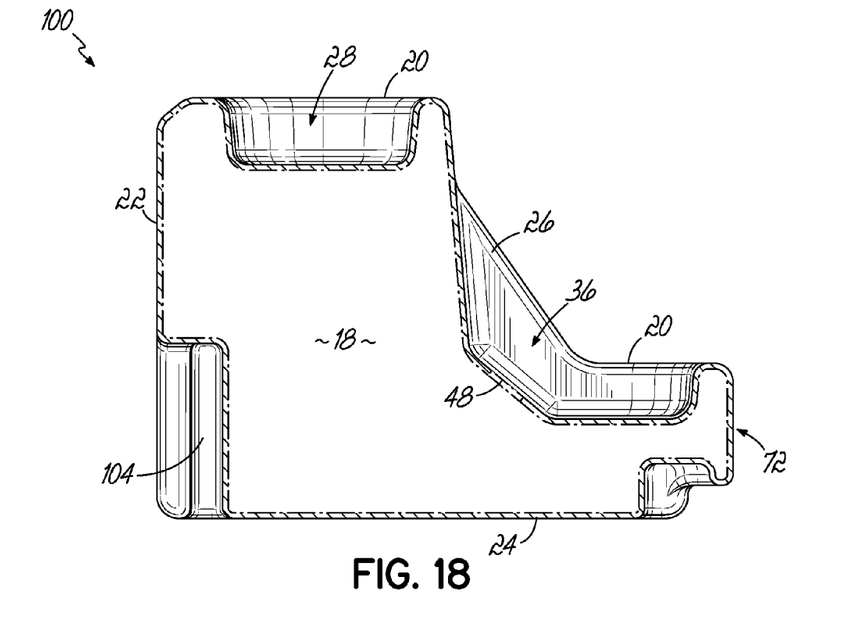
FIG. 18 is a cross-sectional view taken along line 18-18 of FIG. 12. The broken line adjacent to the cross-sectional shading portion of the bowl forms an unclaimed boundary of the design.

The pet bowl 100 of this embodiment further includes a pair of recessed side handles 102 formed on opposing sides of the sidewall 26 at the rear portion 16 of the housing 12. These side handles 102 provide additional places to grip or carry the pet bowl 10 in the first/dispensing orientation. The pet bowl 100 of this embodiment also includes a mounting structure 104 provided in the rear wall 22 or on an opposing side from the handle 72. The mounting structure 104 may be a generally T-shaped groove configured to engage a corresponding T-shaped hook (not shown) on a vehicle or other structure, as shown in FIG. 17. It will be understood that the side handles 102 and mounting structure 104 may be provided in different shapes and forms within the scope of the present invention.

While the present application shows and describes several preferred embodiments, the inventors do not intend to limit the scope of the appended claims to the specific details shown or described. Those skilled in the art will recognize that the disclosed embodiments are susceptible to a reasonable amount of modification and/or permutation, without departing from the overall scope of the invention.

We claim:

1. A pet bowl comprising:
a unitary housing having a front portion with a front end and a rear portion; the housing defining an internal chamber having a top wall, a bottom wall upon which the housing sits in a first/dispensing orientation, and a rear wall upon which the housing sits in a second/storage orientation;
an open-topped first receptacle located at the rear portion of the housing and defined by recessed portions in the top wall;
an open-topped second receptacle located at the front portion of the housing and defined by the top wall and a sidewall forming a first lip at the front end, the second receptacle positioned between the front end and the rear portion of the housing;
a fluid flow port defined in the housing at the front portion, the fluid flow port providing fluid communication between the second receptacle and the internal chamber; and
a groove defining a second lip in the bottom wall at the front end of the front portion of the housing, the first and second lips collectively defining a handle for securely carrying the pet bowl when the housing is in the second orientation; wherein the top wall includes a first portion forming a bottom of the second receptacle, a second portion generally transverse to the first portion and forming a side of the second receptacle, and a third portion disposed between the first and second portions and generally angled from the first and second portions, and
wherein the fluid flow port is located in the third portion of the top wall such that when the housing is in the first orientation, water from the internal chamber flows through the fluid flow port into the second receptacle until the water in the second receptacle covers the fluid flow port, and whereby atmospheric air pressure on the water in the second receptacle prevents further water flow through the fluid flow port; and
wherein the housing further defines a transition wall disposed between the rear wall and the bottom wall at the rear portion, the transition wall enabling tipping of the housing from the first orientation to the second orientation; and
an exit port located in the transition wall and providing fluid communication between the internal chamber and an exterior; and
a cap selectively engaged with the exit port to permit refilling and draining of the internal chamber.

2. The pet bowl of claim 1, wherein the housing, the sidewall, and the handle are integrally formed of a plastic material.

3. The pet bowl of claim 2, wherein the housing, the sidewall, and the handle are formed by rotational molding of a medium density polyethylene (MDPE) material.

4. The pet bowl of claim 1, wherein the transition wall is generally parallel to the third portion of the top wall such that the housing may sit on the transition wall in a third/draining orientation, thereby permitting all water in the second receptacle to drain back through the fluid flow port into the internal chamber.

5. The pet bowl of claim 1, further comprising:
a food guard coupled to the top wall between the front portion and the rear portion of the housing, the food guard configured to prevent food held in the first receptacle from falling into the second receptacle.

6. The pet bowl of claim 1, further comprising:
a mounting structure disposed on an opposing side of the housing from the handle.

7. The pet bowl of claim 1, wherein the housing further includes a pair of recessed side handles formed along opposing sides of the rear portion of the housing and below the first receptacle when the housing is in the first orientation.

8. A pet bowl comprising:
a unitary housing having a front portion and a rear portion, the housing defining an internal chamber having a top wall, a bottom wall upon which the housing sits in a first/dispensing orientation, a rear wall upon which the housing sits in a second/storage orientation, and a transition wall angled from and disposed between the rear wall and the bottom wall at the rear portion;
an open-topped first receptacle located at the rear portion of the housing and defined by recessed portions in the top wall;
an open-topped second receptacle located at the front portion of the housing and defined by the top wall and a sidewall, the top wall further including a first portion forming a bottom of the second receptacle, a second portion generally transverse to the first portion and forming a side of the second receptacle, and a third portion disposed between the first and second portions and generally angled from the first and second portions; and
a fluid flow port located in the third portion of the top wall to place the second receptacle in fluid communication with the internal chamber, wherein water in the internal chamber flows through the fluid flow port into the second receptacle when the housing is in the first orientation, wherein the transition wall is generally parallel to the third portion of the top wall such that the housing may sit on the transition wall in a third/draining orientation, thereby permitting water in the second receptacle to drain back through the fluid flow port into the internal chamber wherein the third portion of the top wall defines a concave profile surrounding the fluid flow port to encourage the flow of the water from second receptacle toward the fluid flow port when the housing sits in the third orientation; and an exit port located in the transition wall and providing fluid communication between the internal chamber and an exterior; and a cap selectively engaged with the exit port to permit refilling and draining of the internal chamber.

9. The pet bowl of claim 8, wherein the second portion of the top wall includes at least one ridge projecting outwardly to inhibit flow of water from the second receptacle away from the fluid flow port when the housing sits in the third orientation.

10. The pet bowl of claim 8, wherein the housing and the sidewall are integrally formed of a plastic material.

11. The pet bowl of claim 10, wherein the housing and the sidewall are formed by rotational molding of a medium density polyethylene (MDPE) material.

12. The pet bowl of claim 8, further comprising:
a food guard coupled to the top wall between the front portion and the rear portion of the housing, the food guard configured to prevent food held in the first receptacle from falling into the second receptacle.

13. The pet bowl of claim 8, further comprising:
a mounting structure disposed on the rear portion of the housing.

* * * * *